United States Patent
Wright, Sr.

[11] Patent Number: 5,674,423
[45] Date of Patent: Oct. 7, 1997

[54] HEATED MOUSE PAD

[76] Inventor: Dennis E. Wright, Sr., 6145 Furnace Rd., Ontario, N.Y. 14519

[21] Appl. No.: 352,845

[22] Filed: Dec. 2, 1994

[51] Int. Cl.[6] .............. H05B 3/34; B68G 5/00; A61F 7/00
[52] U.S. Cl. .............. 219/549; 219/217; 219/544; 219/528; 248/118; 248/918; 400/715; 607/98; 607/111; 607/152; 601/15
[58] Field of Search .............. 219/200–201, 219/213, 217, 528–529, 544, 548, 549; 400/715; D14/114; 248/118, 118.1, 118.3, 118.5, 346, 633, 918; 607/98–99, 111, 152, 108–110, 144, 96; 601/15

[56] References Cited

U.S. PATENT DOCUMENTS

| | | | |
|---|---|---|---|
| Re. 29,641 | 5/1978 | Woods | 219/529 |
| D. 328,892 | 8/1992 | Miller | D14/114 |
| 2,392,712 | 1/1946 | Woodman | 219/529 |
| 2,771,537 | 11/1956 | Lichtenstein | 219/529 |
| 2,844,696 | 7/1958 | Custer | 219/213 |
| 3,178,559 | 4/1965 | Fogel et al. | |
| 4,042,803 | 8/1977 | Bickford | 219/211 |
| 4,186,294 | 1/1980 | Bender | 219/528 |
| 4,187,844 | 2/1980 | Caprio, Jr. | 602/65 |
| 4,245,149 | 1/1981 | Fairlie | |
| 4,599,095 | 7/1986 | Barnes et al. | 219/548 |
| 4,628,188 | 12/1986 | Andreasson | |
| 4,629,868 | 12/1986 | Svensson | 219/528 |
| 4,661,689 | 4/1987 | Harrison | |
| 4,788,417 | 11/1988 | Graflind | |
| 4,868,898 | 9/1989 | Seto | |
| 4,891,501 | 1/1990 | Lipton | |
| 5,069,951 | 12/1991 | Egan | 428/172 |
| 5,151,578 | 9/1992 | Phillips | |
| 5,160,828 | 11/1992 | Olsen | |
| 5,163,646 | 11/1992 | Engelhardt | 400/715 |
| 5,165,630 | 11/1992 | Connor | 248/118.1 |
| 5,188,095 | 2/1993 | Healy | 601/61 |
| 5,228,655 | 7/1993 | Garcia et al. | 248/118 |
| 5,340,075 | 8/1994 | Schriner | 248/118 |
| 5,356,099 | 10/1994 | Sereboff | 248/918 |
| 5,445,349 | 8/1995 | Hart | 248/118 |
| 5,451,743 | 9/1995 | du Preez | 219/544 |
| 5,477,033 | 12/1995 | Bergholtz | 219/549 |
| 5,566,913 | 10/1996 | Prokop | 248/118 |
| 5,572,941 | 11/1996 | Amos | 248/118 |
| 5,599,280 | 2/1997 | Wolden | 248/918 |

FOREIGN PATENT DOCUMENTS

| | | | |
|---|---|---|---|
| 0454184 | 10/1991 | European Pat. Off. | |
| 64-54131 | 3/1989 | Japan | |
| 203814 | 7/1992 | Japan | 219/548 |

*Primary Examiner*—Teresa J. Walberg
*Assistant Examiner*—Raphael Valencia
*Attorney, Agent, or Firm*—Nixon, Hargrave, Devans & Doyle

[57] ABSTRACT

A computer mouse pad is heated for reducing repetitive motion stress for a user and for providing potential therapeutic treatment for the user's hand and wrist while operating a mouse thereon. The pad has a resistance-type heating element which is embedded in the rubber material of the pad. The mouse is either a stationary mouse or a conventional movably positioned mouse and is operated on the level section of the top surface of the pad. If a stationary mouse is utilized, the user's hand and wrist are support by an elevated section of the top surface of the pad. A non-skid surface is on the bottom of the pad. A conventional electric power outlet is utilized as the power source.

25 Claims, 1 Drawing Sheet

HEATED MOUSE PAD

BACKGROUND OF THE INVENTION

1. Field of the Invention

The present invention relates generally to a computer mouse pad and, more particularly, to a mouse pad which is heated, for relieving repetitive motion stress for a user and for providing potential therapeutic treatment for the user's hand and wrist while operating a mouse.

2. Description of the Prior Art

It is the practice of computer operators, graphic artists and the like to actuate a stationary mouse or to actuate a movable mouse by sliding it horizontally about a surface. The conventional computer mouse and other computer input devices like keyboards have one or more buttons or keys that are spring biased in one direction and are operated by pressing the button or key in a direction opposed to the bias in order to make an electrical contact inside the mouse. Continuous operation of such a mouse over any substantial period of time can be fatiguing. Furthermore, the widespread proliferation of computer mice have contributed to a significant increase in incidences of a repetitive motion stress injury known as carpal tunnel syndrome. Carpal tunnel syndrome is a serious condition that can lead to permanent damage of the nerves and joints and is often accompanied by tingling or numbness of a user's hands. It is known that such tingling and numbness comes from compression of the median and ulnar nerves when the carpal ligaments move in a repetitive fashion, over a period of time, through the carpal tunnel in the wrist.

The present invention relates to the discovery that the utilization of heat in a mouse pad allows the user to minimize the onset of carpal tunnel syndrome and ulnar nerve irritation and the like, in spite of extensive sessions of utilizing the mouse.

It is well known that heat can be used in the therapeutic treatment of injured muscles. Heat treatment pads are well known in the prior art. Examples of the prior art are the following: U.S. Pat. No. 4,891,501 issued Jan. 2, 1990 to Barry Lipton is directed to a therapeutic pad for treating upper body muscles. U.S. Pat. No. 5,151,578 issued Sep. 29, 1992 to Jerry G. Phillips is directed to an anisotropically bendable heating pad which remains flat when applied to a vertical body surface.

A pad which is heated and possesses antistatic properties so as to be useful in offices where computers are present is seen in U.S. Pat. No. 4,661,689 issued Apr. 28, 1987 to John M. Harrison. However, the pad disclosed in this patent is configured as a floor heating pad or the like.

Other, less relevant heating pad disclosures related to therapeutic treatment of the affected area by direct contact are found in U.S. Pat. Nos. 3,178,559 issued Apr. 13, 1965 to Mortimer A. Fogel et al. and 5,160,828 issued Nov. 3, 1992 to Richard G. Olsen, and European Patent Application 0 454 184 published Oct. 30, 1991, Anthony J. Last, inventor.

Additional teachings of heating pads for chairs are found in U.S. Pat. Nos.: U.S. Pat. No. 4,245,149 issued Jan. 13, 1981 to Ian F. Fairlie; U.S. Pat. No. 4,628,188 issued Dec. 9, 1986 to Jan Andreasson; and U.S. Pat. No. 4,868,898 issued Sep. 19, 1989 to Hiroshi Seto; such a pad for a mattress is taught in U.S. Pat. No. 4,788,417 issued Nov. 29, 1988 to Leif Graflind. Disclosure of a resistance element heating pad with a thick material base is disclosed in Japan Patent document 64-54131 dated Mar. 1, 1989.

However, none of the above inventions and patents, taken either singly or in combination, is seen to describe the instant invention as claimed.

SUMMARY OF THE INVENTION

The present invention relates to a computer mouse pad which is heated for reducing repetitive motion stress for a user and for providing potential therapeutic treatment for the user's hand and wrist while operating a mouse thereon. The pad has a resistance-type heating element which is embedded in the rubber material of the pad. The mouse is either a stationary mouse or a conventional movably positioned mouse, and is operated on the level section of the top surface of the pad. If a stationary mouse is utilized, the user's hand and wrist are supported by a depressed area within an elevated section of the working surface of the pad. A non-skid surface is on the bottom of the pad. Conventional electrical controls maintain a uniform temperature range and a standard, 120 v electrical power outlet is utilized as the power source.

Accordingly, it is a principle object of the invention to provide a heated mouse pad for covering a work surface and for maintaining a warm environment for a user's hand and wrist while operating the mouse.

It is an object of the invention to provide a heated mouse pad for use while operating a stationary mouse or a movably positioned mouse whereby the muscles of the user's hand and wrist are potentially therapeutically treated during the operation of the mouse.

It is a further object of the invention to provide a heated mouse pad having a hand and wrist pad support for use with a stationary computer mouse.

Still another object of the invention is to provide a heated mouse pad which can be utilized by a user while operating a mouse in a comfortable and convenient manner over long periods of time.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
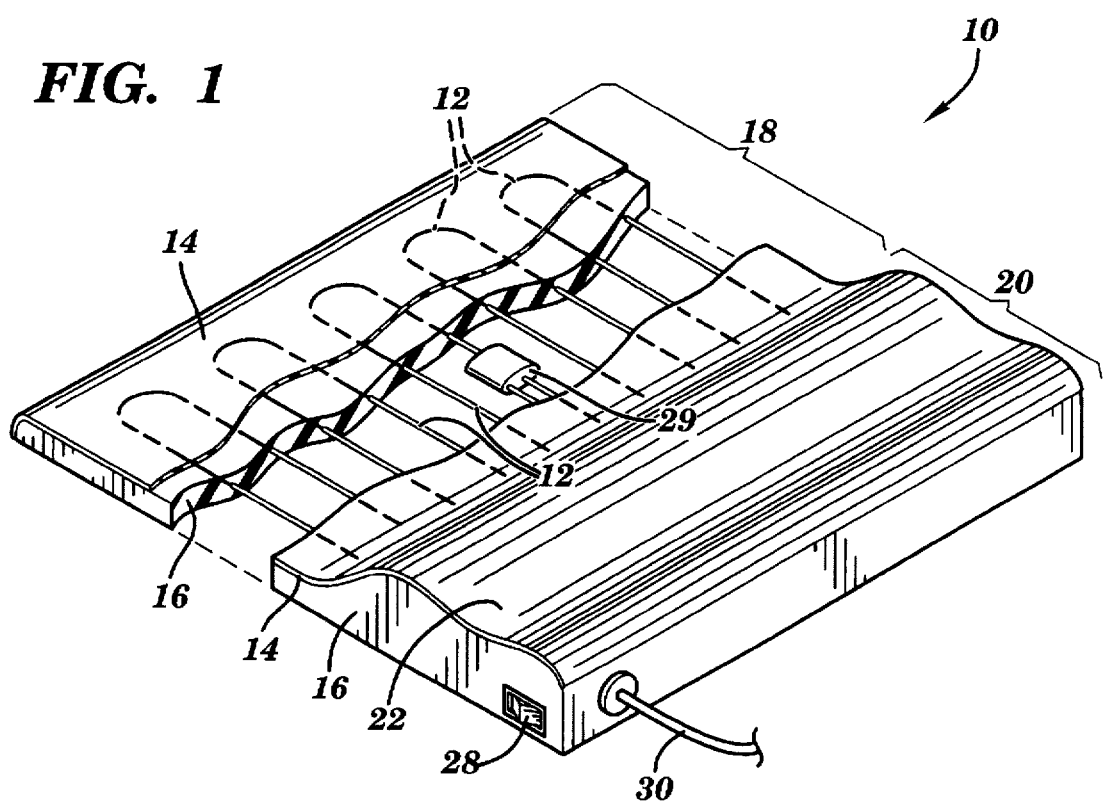
FIG. 1 is a perspective view of a heated mouse pad, partially cut away to show an embedded heating element.

FIG. 1 illustrates a heated mouse pad 10, and the view is partially cut away to reveal details of an embedded heating element 12. The pad 10 includes a thin upper layer 14 and a thick lower layer 16. The upper layer 14 is made of a fabric material such as vinyl fabric, canvas fabric and the like. The top surface of the upper layer 14 is the working area of the pad 10. The working surface includes a forward end 18, which is a substantially planar or level surface, and a rear end 20 which is an elevated surface with a slight or small elongated depression area 22 through approximately the middle of the rear end 20. The forward planar surface 18 constitutes substantially two-thirds of the area of the working surface. A computer stationary mouse 24 is positioned on the forward planar surface 18 for its operation thereon. The remaining substantially one-third of the area of the working surface constitutes the rear elevated surface 20 with its depression area 22.

Figure 2:
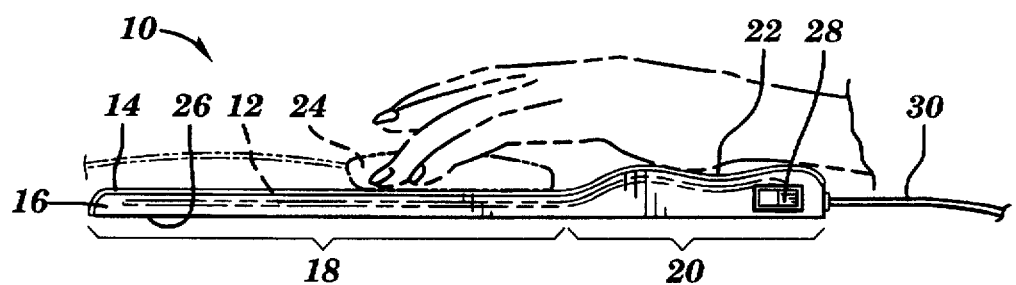
FIG. 2 is a side sectional view of the pad showing a stationary mouse and the hand and wrist of a user positioned on an elevated supporting section of the pad.

As illustrated in FIG. 2, the rear elevated surface 20 has an elevational height that is substantially the same as the height of the top of the stationary mouse 24. The rear elevated surface with its elongated depression area 22 is dimensioned and configured for supporting the curvature of a user's hand and wrist thereon. The lower layer 16 is made of a resilient rubber material. A bottom surface 26 of the lower layer 16 has a non-skid characteristic whereby the bottom surface 26 remains firmly and rigidly mounted when the pad is positioned on a supporting surface such as a table top.

For heating the pad 10, the electrical heating element 12 is embedded or molded within the lower layer 16. The electrical heating element 12 is a single, sinuously looped resistive heating wire. A thermal switch 28 or the like for switch controlling the heating element 12 is mounted on a side wall of the lower layer 16 and is electrically connected within the circuit. Further control means comprising a thermostat 29 is connected in series with the heating element 12. The heating wire element 12 is electrically connected via an electric power cord 30 to a conventional power outlet, e.g., 120 VAC (not shown). Further, it has been determined that a desired temperature range for the appropriate operation of the heating pad 10 is from 90 to 100 degrees Fahrenheit. This range is considered within a desired comfort zone for the user's hand and wrist and is deemed a "not too cool and not too warm" environment. Conventional electrical and thermostat controls are incorporated within the electrical line to achieve and maintain the desired temperature range.

Figure 3:
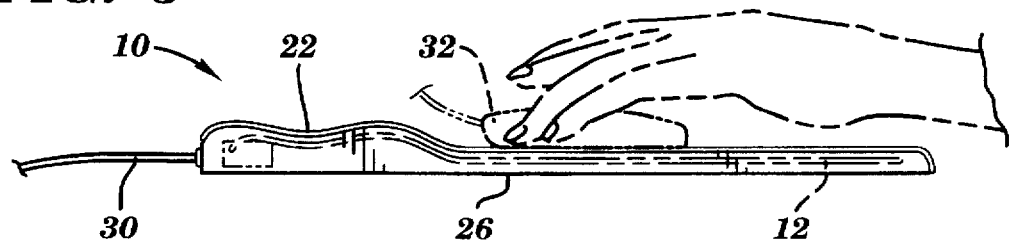
FIG. 3 is a reverse position of the pad in FIG. 2, showing a conventional movable mouse being operated thereon without utilizing the supporting section.

FIG. 3 illustrates the pad 10 in a reverse disposition of the pad 10 than is shown in FIG. 2. The pad 10 has been rotated 180° to provide for the required mobility space for a mouse 32 which is of the movably positioned type. Thus, in the FIG. 3 configuration of the invention, the rear elevated surface 20 is not utilized and the mobile mouse 32 is free to be moved about on the forward planar surface 18.

In summary, a typical mouse pad constructed according to the teachings of the instant invention is square-shaped, having dimensions of 10 inches by 10 inches, approximately. The thickness of the pad is about ⅜ of an inch. Thus, the elevated surface of the working area is about ½ to ⅝ of an inch above a supporting surface, e.g., desk top or table top. The regulating controls associated with the electrical heating element maintain the temperature range for the pad from 90° to 100° Fahrenheit.

It is to be understood that the present invention is not limited to the embodiment described above, but encompasses any and all embodiments within the scope of the following claims.

I claim:

1. A heated computer mouse pad for reducing repetitive motion stress for a user and for providing potential therapeutic treatment for the user's hand and wrist while operating a mouse thereon, comprising:

an upper layer and a lower layer, the lower layer having a non-skid area for engagement with a supporting surface;

a working surface on the upper layer, the working surface having a forward end and a rearward end, the forward end having a planar surface; the planar surface being adapted to receive a computer mouse thereupon; the rearward end having an elevated portion adapted to support and warm the user's hand and wrist;

four peripheral edges, each having a substantially uninterrupted surface;

electrical means embedded in said lower layer for heating the pad, said electrical means being connected to an electrical power cord that extends from the surface of only one of said peripheral edges; and control means associated with the electrical means that regulates power thereto.

2. A heated computer mouse pad according to claim 1, wherein the upper layer is made of a fabric material.

3. A heated computer mouse pad according to claim 2, wherein the fabric material is a vinyl fabric.

4. A heated computer mouse pad according to claim 2, wherein the fabric material is a canvas fabric.

5. A heated computer mouse pad according to claim 1, wherein the lower layer is made of a rubber material.

6. A heated computer mouse pad according to claim 1, wherein the planar surface constitutes substantially two-thirds of the area of the working surface.

7. A heated computer mouse pad according to claim 6, wherein the remaining substantially one-third of the area of the working surface is configured as an elevated area, there further being a depression, dimensioned and configured for supporting a user's hand and wrist thereupon.

8. A heated computer mouse pad according to claim 1, wherein said electrical means comprises a heating element comprising resistive wire.

9. A heated computer mouse pad according to claim 1, wherein said control means is selected from the group consisting of a thermostat and a switch.

10. A heated computer pad for reducing repetitive motion stress of a user and for providing potential therapeutic treatment for the user's hand and wrist while operating a computer, comprising:

an upper layer and a lower layer, the lower layer having a non-skid bottom surface for engagement with a supporting surface;

a working surface on the upper layer, the working surface having a forward first end and a rearward second end; the forward first end having a level surface; the rearward second end having a surface elevated relative to the surface of the first end and including an elongated depression dimensioned and configured for supporting the user's hand and wrist thereon;

four peripheral edges, each having a substantially uninterrupted surface;

an electrical element molded into the lower layer for heating the pad and thereby the user's hand and wrist, said electrical element being provided with an electrical power cord that extends from the surface of only one of said peripheral edges; and control means associated with the electrical element that regulates power thereto.

11. A heated mouse pad according to claim 10, wherein the upper layer is made of a fabric material.

12. A heated computer pad according to claim 11 wherein the fabric material is a vinyl fabric or a canvas material.

13. A heated computer mouse pad according to claim 10, wherein the lower layer is made of a rubber material.

14. A heated computer mouse pad according to claim 10, wherein the level surface constitutes substantially two-thirds of the area of the working surface.

15. A heated computer pad according to claim 10 further comprising a switch for controlling the electrical element.

16. A heated computer pad according to claim 10 wherein the electrical element provides for heating the second end of the pad to a surface temperature of about 90 to 100 degrees Fahrenheit.

17. A heated computer pad according to claim 10, wherein said electrical means comprises a heating element comprising resistive wire.

18. A heated computer pad according to claim 10, wherein said control means is selected from the group consisting of a thermostat and a switch.

19. A heated computer mouse pad for reducing repetitive motion stress of a user and for providing potential therapeutic treatment for the user's hand and wrist while operating a mouse thereon, comprising in combination:

an upper layer and a lower layer, the lower layer having a non-skid bottom surface for engagement with a supporting surface;

a working surface on the upper layer, the working surface having a plurality of sectional surface areas; one sectional surface area constituting a planar working area for operation of the computer mouse thereon; another sectional surface being dimensioned and configured as an elevated area for supporting the user's hand and wrist thereon;

four peripheral edges, each having a substantially uninterrupted surface;

an electrical heating device molded within the lower layer for heating the pad and provided with an electrical power cord that extends from the surface of only one of said peripheral edges; and means associated with the electrical heating device for providing uniform heat to the pad, whereby said elevated area is employed by a user to support the wrist and hand of the user while the mouse controls are operated, and upon reorientation 180 degrees of the pad with respect to the user, the said one sectional surface area is employed to support the mouse, the said elevated area remaining unemployed during such reoriented configuration of the pad.

20. A heated computer mouse pad according to claim 19, wherein the upper layer is made of a fabric material.

21. A heated computer mouse pad according to claim 20, wherein the fabric material is a vinyl fabric.

22. A heated computer mouse pad according to claim 20, wherein the fabric material is a canvas material.

23. A heated computer mouse pad according to claim 19, wherein the bottom layer of the lower surface is made of a rubber material.

24. A heated computer mouse pad according to claim 19, wherein the planar working surface constitutes substantially two-thirds of the area of the working surface.

25. A heated computer mouse pad according to claim 19, wherein the elevated area constitutes substantially one-third of the area of the working surface.

* * * * *